United States Patent Office 3,090,719
Patented May 21, 1963

3,090,719
HIGH-STABILITY INSECTICIDE COMPOSITIONS, EMULSIFIABLE OR SOLUBLE IN WATER, OF N-MONOMETHYLAMIDE OF O,O-DIMETHYL-DITHIOPHOSPHORYLACETIC ACID
Franco Pinamonti, Milan, Italy, assignor to Montecatini Società Generale per l'Industria Mineraria e Chimica, a corporation of Italy
No Drawing. Filed Apr. 25, 1961, Ser. No. 105,283
Claims priority, application Italy Apr. 28, 1961
7 Claims. (Cl. 167—22)

The processes for preparing the N-monomethylamide of O,O-dimethyldithiophosphorylacetic acid and the parasiticidal compositions containing the said compound are the subject of the following U.S. patent applications of the applicant: Serial Nos. 634,181, filed January 15, 1957, now U.S. Patent No. 3,004,055; 65,010, filed October 26, 1960; 829,535, filed July 27, 1959, now U.S. Patent No. 3,032,579; and 569,957, filed March 7, 1956, now abandoned.

The present invention is an improvement over the above processes. It relates to a particular feature of the formulation technique of the above compounds.

I have found that by suitable formulations the stability in time (shelf life) of N-monomethylamide of O,O-dimethyldithiophosphoryl acetic acid can be increased, which is very important for its use.

It is known that the above compound has a high pesticidal activity when used either alone or formulated as an emulsifiable solution. It is also known that the compound undergoes a decrease of the active substance content and, therefore, a decrease of biological activity after a more or less prolonged storage period. The decrease of the content of active substance with time is not great enough to prevent utilization; however, it results in a considerable loss of product which should be avoided. This decrease is directly connected with the temperature of the storage area.

The mechanism of the decomposition is not completely clear. However, it seems to consist of an isomerization reaction analogous to that which occurs in case of other phosphoric esters, e.g. Parathion (p-nitrophenyl-diethyl-dithiophosphate), caused by temperature increase. The apparent decomposition mechanism is as follows:

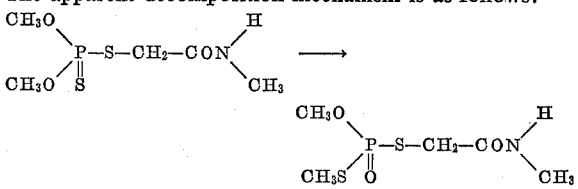

The S-methyl isomer formed by degradation has a very low biological activity, about 1/50 of the unaltered active substance.

The present invention has as an object the formulation of N-monomethylamide of O,O-dimethyldithiophosphorylacetic acid insecticides which are emulsifiable or soluble in water and have a particularly high thermal stability with respect to time.

Applicant has found that compositions, emulsifiable or soluble in water, which have a high thermal stability, can be obtained only by using suitable solvents whose behavior in this specific case could not be foreseen from the knowledge of their nature.

Suitable solvents, which delay, to a greater or lesser extent, the degradation of the compound in question, even at high temperatures, are taken from the group consisting of aromatic hydrocarbons, aliphatic ketones, cyclic ketones (also called cycloparaffinic ketones), acetates of primary alcohols, glycol ether acetates and trialkylphosphoric esters.

This is clearly demonstrated by the data reported in the following table. The table shows the percent decrease of active substance content (relative to the active substance content of the starting product), at 70° C. of 20% solutions of N-monomethylamide of O,O-dimethyl-dithiophosphorylacetic acid (concentration usually employed in liquid formulations) in the aforementioned solvents.

The active substance per se and solutions of the substance in solvents generally used for parasiticidal products at a 20% concentration were employed as comparison, under the same experimental conditions.

The determination of the content of active substance was carried out by the arsenometric method published in "La Chimica e l'Industria" (April 1960, Fusco, Placucci, Marchese and Losoo) in which the degradation products are not determined.

TABLE

| 20% N-monomethylamide of O,O-dimethyl-dithiophosphoryl acetic acid solutions in the following solvents | Percent decrease of the arsenometic active substance content after storage at 70° C. for 10 days |
|---|---|
| Diethylene glycol | 98.0 |
| Propylene glycol | 91.5 |
| Benzyl alcohol | 86.0 |
| Triethylene glycol | 84.0 |
| Methylcyclohexane | 72.0 |
| Methyl alcohol | 70.0 |
| Amyl alcohol | 66.0 |
| Isoamyl alcohol | 62.0 |
| Isobutyl alcohol | 56.0 |
| N-butyl alcohol | 55.5 |
| Methylcellosolve (2-methoxyethanol) | 52.0 |
| Methylisobutylcarbinol | 32.0 |
| Diacetone alcohol | 28.0 |
| Triisobutyl phosphate | 23.5 |
| Tri-n-propylphosphate | 19.5 |
| Acetophenone | 18.0 |
| Methylcyclohexanone | 17.0 |
| Methylamylketone | 10.0 |
| Ethylamylketone | 9.0 |
| Butylcarbitol acetate | 8.0 |
| Methylamylacetate | 8.0 |
| Butyl cellosolve acetate | 6.0 |
| Triethylphosphate | 5.0 |
| Methylisobutyl ketone | 4.0 |
| Carbitol acetate | 2.0 |
| Primary amyl acetate | 2.0 |
| Cyclohexanone | 2.0 |
| Xylene [1] | 0.5 |
| Cellosolve acetate | 0.5 |
| 95% N-monomethylamide of O,O-dimethyl-dithiophosphoryl acetic acid | 100.0 |

[1] Xylene has a positive stabilizing action but cannot be used alone as a solvent in the formulations due to insufficient solubility of the active substance in this solvent at low temperature.

It appears from the above results that, while under the conditions described above, the active substance is completely destroyed in some solvents, there are some other solvents which almost completely stop the undesirable degradation of the active substance.

It is shown by the above table that the solvents containing hydroxy groups have no appreciable stabilizing property and that, when the alcoholic function is not present, a marked improvement occurs.

It now becomes possible to prepare liquid formulations containing high concentrations of N-monomethylamide of O,O-dimethyldithiophosphoryl acetic acid whose stability can be insured even under prolonged storage conditions. In these formulations, I use the aforementioned solvents alone or mixtures thereof, together with anionic or non-ionic surface active agents, which act as emulsifying or dispersing agents.

Storage tests were carried out with the above formulations. Samples of the formulations were stored in closed glass flasks at 50° C. for 60 days or more, unless otherwise specified. The content of the active substance was then determined by a chemical method as described above.

The parasiticidal biological activity of the active substance was ascertained before and after the thermal treatment. The biological tests were carried out by topic application, using as test insect the domestic fly (sensitive strain, female, 5 days old), and observing the mortality 20 hours after the treatment. As an index of the biological activity of the samples before and after the thermal treatment was used, the ratio between the LD 50 was obtained by a graphic method on the test sample and on the sample of pure N-monomethylamide of O,O-dimethyl-dithiophosphoryl acetic acid. The results of these tests confirm the stabilizing action of the solvents in complete agreement with the results of stabilization of the solutions obtained in the tests at 70° C. for 10 days.

It has also been ascertained that the solvents having a higher stabilizing action can be suitably diluted with cheaper solvents. These cheaper solvents, due to their lower protective action or to other characteristics, are not suitable for formulation without remarkably decreasing the thermal stability of the resulting composition.

The following examples are given to illustrate the present invention, without limiting its scope.

*Example 1*

20 g. of 95% monomethylamide of O,O-dimethyldithiophosphorylacetic acid are dissolved in 78 g. of Cellosolve acetate with 2 g. of a non-ionic emulsifier selected from the class consisting of condensates of ethylene oxide with alkylphenols or fatty acids.

The composition thus obtained, subjected to the accelerated stability test at 50° C. for 60 days, gave the following results:

| | Percent |
|---|---|
| Initial active substance content | 19.1 |
| Active substance content after 60 days at 50° C. | 19.05 |
| Initial biological activity | 95.2 |
| Biological activity after 60 days at 50° C. | 95.1 |

*Example 2*

The following composition is prepared as shown in Example 1:

| | Percent |
|---|---|
| 95% monomethylamide of O,O-dimethyldithiophosphorylacetic acid | 20 |
| Cellosolve acetate | 55 |
| Xylene | 20 |
| Anionic surface-active agent selected from the class consisting of alkaline alkylaryl sulfonates | 3.5 |
| Non-ionic surface-active agent selected from the class consisting of the condensates of ethylene oxide with fatty acids or alkylphenols | 1.5 |

The results obtained in the stability tests at 50° C. for 60 days were as follows:

| | Percent |
|---|---|
| Initial active substance content | 19.15 |
| Active substance content after 60 days at 50° C. | 19.10 |
| Initial biological activity | 94.5 |
| Biological activity after 60 days at 50° C. | 95.2 |

*Example 3*

The following composition is prepared as described in Example 1:

| | Percent |
|---|---|
| 95% monomethylamide of O,O-dimethyldithiophosphorylacetic acid | 20 |
| Cellosolve acetate | 50 |
| Primary amyl acetate | 25 |
| Anionic surface-active agent selected from the class consisting of alkaline alkylaryl sulfonates | 5 |

The results obtained in the stability tests at 50° C. for 60 days were as follows:

| | Percent |
|---|---|
| Initial active substance content | 19.1 |
| Active substance content after 60 days at 50° C. | 19.02 |
| Initial biological activity | 95.3 |
| Biological activity after 60 days at 50° C. | 95.1 |

*Example 4*

The following composition is prepared as shown in Example 1:

| | Percent |
|---|---|
| 95% monomethylamide of O,O-dimethyldithiophosphorylacetic acid | 20 |
| Cyclohexanone | 35 |
| Xylene | 40 |
| Non-ionic surface-active agent selected from the class consisting of condensates of ethylene oxide with alkylphenols or fatty acids | 5 |

The results obtained in the stability tests at 50° C. for 60 days were as follows:

| | Percent |
|---|---|
| Initial active substance content | 19.02 |
| Active content after 60 days at 50° C. | 19.01 |
| Initial biological activity | 94.96 |
| Biological activity after 60 days at 50° C. | 94.91 |

*Example 5*

The following composition was prepared as described in Example 1:

| | Percent |
|---|---|
| 95% monomethylamide of O,O-dimethyldithiophosphorylacetic acid | 20 |
| Cellosolve acetate | 45 |
| Xylene | 30 |
| Anionic surface active agent | 5 |

The results obtained in the stability tests at 50° C. for 60 days are of the same order as those reported in Examples 1 and 2.

*Example 6*

The formulation prepared as described in Example 1 has the following composition:

| | Percent |
|---|---|
| 95% monomethylamide of O,O-dimethyldithiophosphorylacetic acid | 20 |
| Cellosolve acetate | 40 |
| Primary amyl acetate | 35 |
| Non-ionic surface-active agent | 5 |

The results obtained in the stability tests at 50° C. for 60 days are of the same order as those reported in Examples 1 and 2.

*Example 7*

The formulation prepared as described in Example 1 has the following composition:

| | Percent |
|---|---|
| 95% monomethylamide of O,O-dimethyldithiophosphorylacetic acid | 20 |
| Carbitol acetate | 75 |
| Anionic surface-active agent | 5 |

The results obtained in the stability tests at 50° C. for 60 days are of the same order as those reported in Examples 1 and 2.

*Example 8*

The composition prepared by the method of Example 1 is as follows:

| | Percent |
|---|---|
| 95% monomethylamide of O,O-dimethyldithiophosphorylacetic acid | 20 |
| Carbitol acetate | 45 |
| Xylene | 30 |
| Anionic surface-active agent | 5 |

The results obtained in the stability tests at 50° C. for 60 days are of the same order as those reported in Examples 1 and 2.

*Example 9*

| | Percent |
|---|---|
| 95% monomethylamide of O,O-dimethyldithiophosphorylacetic acid | 20 |
| Cyclohexanone | 30 |
| Xylene | 45 |
| Non-ionic surface-active agent | 2.5 |
| Anionic surface-active agent | 2.5 |

The results obtained in the stability tests at 50° C. for 60 days are of the same order as those reported in Examples 1 and 2.

*Example 10*

A composition prepared as described in Example 1 is as follows:

| | Percent |
|---|---|
| 95% monomethylamide of O,O-dimethyldithiophosphorylacetic acid | 20 |
| Cyclohexanone | 20 |
| Xylene | 55 |
| Non-ionic surface-active agent | 2.5 |
| Anionic surface-active agent | 2.5 |

The results obtained in the stability tests at 50° C. for 60 days are of the same order as those reported in Examples 1 and 2.

*Example 11*

A composition prepared by the method of Example 1 is as follows:

| | Percent |
|---|---|
| 95% monomethylamide of O,O-dimethyldithiophosphorylacetic acid | 20 |
| Primary amyl acetate | 15 |
| Cyclohexanone | 60 |
| Anionic surface-active agent | 2.5 |
| Non-ionic surface-active agent | 2.5 |

The results obtained in the stability tests at 50° C. for 60 days are of the same order as those reported in Examples 1 and 2.

*Example 12*

A composition prepared as described in Example 1 is as follows:

| | Percent |
|---|---|
| 95% monomethylamide of O,O-dimethyldithiophosphorylacetic acid | 20 |
| Primary amyl acetate | 60 |
| Cyclohexanone | 15 |
| Anionic surface-active agent | 2.5 |
| Non-anionic surface-active agent | 2.5 |

The results obtained in the stability tests at 50° C. for 60 days are of the same order as those reported in Examples 1 and 2.

*Example 13*

Compositions were prepared as described in Example 1 as follows:

| | Percent |
|---|---|
| 95% monomethylamide of O,O-dimethyldithiophosphorylacetic acid | 20 |
| Xylene | 30 |
| Methylisobutylketone | 30 |
| Cellosolve acetate | 15 |
| Non-ionic surface-active agent | 2.5 |
| Anionic surface-active agent | 2.5 |

The results obtained in the stability tests at 50° C. for 60 days are of the same order as those reported in Examples 1 and 2.

*Example 14*

30 g. of 95% monomethylamide of O,O-dimethyldithiophosphorylacetic acid together with 1.5 g. of a surface-active agent selected from the class of alkaline alkylarylsulfonates and 1.5 g. of non-ionic surface-active agents selected from the class consisting of the condensation products of ethylene oxide with alkylphenols or fatty acids, are dissolved in a solvent mixture consisting of 30 g. of cyclohexane and 37 g. of Cellosolve acetate. The composition thus obtained, subjected to the accelerated stability test at 50° C. for 30 days, gave the results reported hereinbelow in comparison with those obtained with a composition containing a hydroxylic solvent (for instance 2-methoxy ethanol) in lieu of the cyclohexanone-Cellosolve acetate solvent.

| | Initial active ingredient content, percent | Active ingredient content after 30 days, percent | Percent decrease of active ingredient content |
|---|---|---|---|
| Composition according to Example 14 | 28.60 | 27.46 | 3.98 |
| Composition with 2-methoxy-ethanol | 28.70 | 19.90 | 30.60 |

*Example 15*

According to the procedure of Example 14, the following composition is prepared:

| | Percent |
|---|---|
| 95% monomethylamide of O,O-dimethyldithiophosphorylacetic acid | 40 |
| Cyclohexanone | 57 |
| Anionic surface-active agent | 1.5 |
| Non-ionic surface-active agent | 1.5 |

The composition thus obtained, subjected to the accelerated stability test at 50° C. for 30 days, gave the results reported hereinbelow in comparison with those obtained with a composition containing a hydroxylic solvent in lieu of the cyclohexanone solvent.

| | Initial content of active ingredient, percent | Active ingredient content after 30 days, percent | Percent decrease of active ingredient content |
|---|---|---|---|
| Composition according to Example 15 | 38.1 | 33.9 | 11 |
| Composition with 2-methoxy-ethanol | 37.90 | 20.8 | 45.1 |

I claim:

1. A liquid insecticide composition of O,O-dimethyldithiophosphorylacetic acid N-monomethylamide, having increased shelf life, said insecticide composition being at least water-emulsifiable, and containing a solvent consisting of Cellosolve acetate.

2. A liquid insecticide composition of O,O-dimethyldithiophosphorylacetic acid N-monomethylamide, having increased shelf life, said insecticide composition being at least water-emulsifiable, and containing a solvent consisting of a mixture of Cellosolve acetate and xylene.

3. A liquid insecticide composition of O,O-dimethyldithiophosphorylacetic acid N-monomethylamide, having increased shelf life, said insecticide composition being at least water-emulsifiable, and containing a solvent consisting of a mixture of Cellosolve acetate and primary amyl acetate.

4. A liquid insecticide composition of O,O-dimethyldithiophosphorylacetic acid N-monomethylamide, having increased shelf life, said insecticide composition being at least water-emulsifiable, and containing a solvent consisting of Carbitol acetate.

5. A liquid insecticide composition of O,O-dimethyldithiophosphorylacetic acid N-monomethylamide, having increased shelf life, said insecticide composition being at least water-emulsifiable, and containing a solvent consisting of a mixture of Carbitol acetate and xylene.

6. A liquid insecticide composition of O,O-dimethyldithiophosphorylacetic acid N-monomethylamide, having increased shelf life, said insecticide composition being at least water-emulsifiable, and containing a solvent consisting of a mixture of xylene, methylisobutylketone and Cellosolve acetate.

7. Liquid insecticide compositions of O,O-dimethyldithiophosphorylacetic acid N-monomethylamide, having increased shelf life, said insecticide compositions being at least water-emulsifiable, and containing a solvent consisting of a glycol ether acetate.

References Cited in the file of this patent

UNITED STATES PATENTS

| | | |
|---|---|---|
| 2,494,283 | Cassaday et al. | Jan. 10, 1950 |
| 2,931,755 | Birum | Apr. 5, 1960 |
| 3,004,055 | Perini et al. | Oct. 10, 1961 |

FOREIGN PATENTS

| | | |
|---|---|---|
| 557,291 | Belgium | Mar. 11, 1960 |

OTHER REFERENCES

Yost et al.: Malathion and its Formulations, Part I, Agriculture Chemicals, September 1955, pages 43–45, 137 and 139.